(12) United States Patent
Rouse

(10) Patent No.: US 8,046,930 B1
(45) Date of Patent: Nov. 1, 2011

(54) PASTA DISPENSER HAVING INTEGRATED PORTION SELECTOR

(76) Inventor: Michael L. Rouse, Vancouver, WA (US)

( * ) Notice: Subject to any disclaimer, the term of this patent is extended or adjusted under 35 U.S.C. 154(b) by 231 days.

(21) Appl. No.: 12/579,285

(22) Filed: Oct. 14, 2009

Related U.S. Application Data

(60) Provisional application No. 61/105,522, filed on Oct. 15, 2008.

(51) Int. Cl.
*G01B 5/08* (2006.01)

(52) U.S. Cl. .............................. 33/524; 33/1 V

(58) Field of Classification Search ............... 33/1 V, 33/501, 524, 525, 555.1, 555, 2
See application file for complete search history.

(56) References Cited

U.S. PATENT DOCUMENTS

| | | | |
|---|---|---|---|
| 3,874,085 A * | 4/1975 | Atkins | 33/524 |
| 4,075,769 A * | 2/1978 | Young | 33/524 |
| D248,713 S | 8/1978 | Dedrick | |
| D248,714 S | 8/1978 | Dedrick | |
| 4,120,094 A | 10/1978 | Pfaelzer | |
| 4,165,565 A | 8/1979 | Cloutier et al. | |
| D254,116 S | 2/1980 | Daenen | |
| 4,196,824 A | 4/1980 | Labelle | |
| 4,214,369 A | 7/1980 | Wasik et al. | |
| 4,268,967 A * | 5/1981 | Brana et al. | 33/1 V |
| D265,158 S | 6/1982 | Green, II | |
| 4,333,241 A | 6/1982 | Wasik et al. | |
| 4,334,361 A | 6/1982 | Gorski et al. | |
| D266,820 S | 11/1982 | Ferrin | |
| 4,387,512 A | 6/1983 | Gorski et al. | |
| D277,358 S | 1/1985 | Krencik | |
| D300,290 S | 3/1989 | Moberg | |
| 5,535,636 A | 7/1996 | Myers | |
| 5,992,035 A | 11/1999 | Otsu | |
| D490,725 S | 6/2004 | Kaposi et al. | |
| D499,029 S | 11/2004 | Maarberg | |
| 6,904,941 B2 * | 6/2005 | Howard | 33/555.1 |
| 2001/0042402 A1 * | 11/2001 | Hoeting et al. | 33/1 V |
| 2008/0060527 A1 | 3/2008 | Battani | |

* cited by examiner

*Primary Examiner* — G. Bradley Bennett
(74) *Attorney, Agent, or Firm* — Marger Johnson & McCollom, P.C.

(57) ABSTRACT

A pasta dispenser includes a portion wheel having variously sized apertures. The portion wheel is integrated into a cap or lid for the dispenser. In use, the user turns the portion wheel to the desired portion size, tips the dispenser, and retrieves the correct amount of pasta. In some embodiments the apertures are oval. Further, some embodiments include an integrated lid that covers the portion wheel to create a contaminate free enclosure for storing pasta. Yet other embodiments include a pasta dispenser including a head unit having an aperture opening and a shutter that can be slid or rotated over the head unit to partially block the aperture opening. When the container is tipped, portions of pasta can slide out of the opening.

22 Claims, 6 Drawing Sheets

PASTA DISPENSER HAVING INTEGRATED PORTION SELECTOR

CROSS REFERENCE TO RELATED APPLICATIONS

This application is a non-provisional application of co-pending provisional application 61/105,522, filed on Oct. 15, 2008, the teachings of which are incorporated by reference herein.

BACKGROUND

Portion measurers for long-noodle pasta such as spaghetti, fettuccini, linguini, bucatini, and angel-hair pasta are known. A typical portion measurer is a series of different-sized holes through a material through which the long noodles are passed. The amount that passes through the selected hole is a precisely measured amount of dry pasta that, when cooked, provides the desired amount of cooked pasta.

These measurers fail to be convenient, however, in that they are an extra kitchen gadget that must be located each time pasta is measured.

Another type of pasta measurer is illustrated in U.S. Pat. No. 4,334,361 to Gorski et al., which includes a container to hold pasta, but lacks any mechanism to positively select any particular quantity. Instead, Gorski's container includes measurement marks for a sliding door to gate the pasta, but nothing keeps the door in a set position during operation.

Embodiments of the invention address this and other limitations of the prior art.

DETAILED DESCRIPTION OF THE EMBODIMENTS

Figure 1:
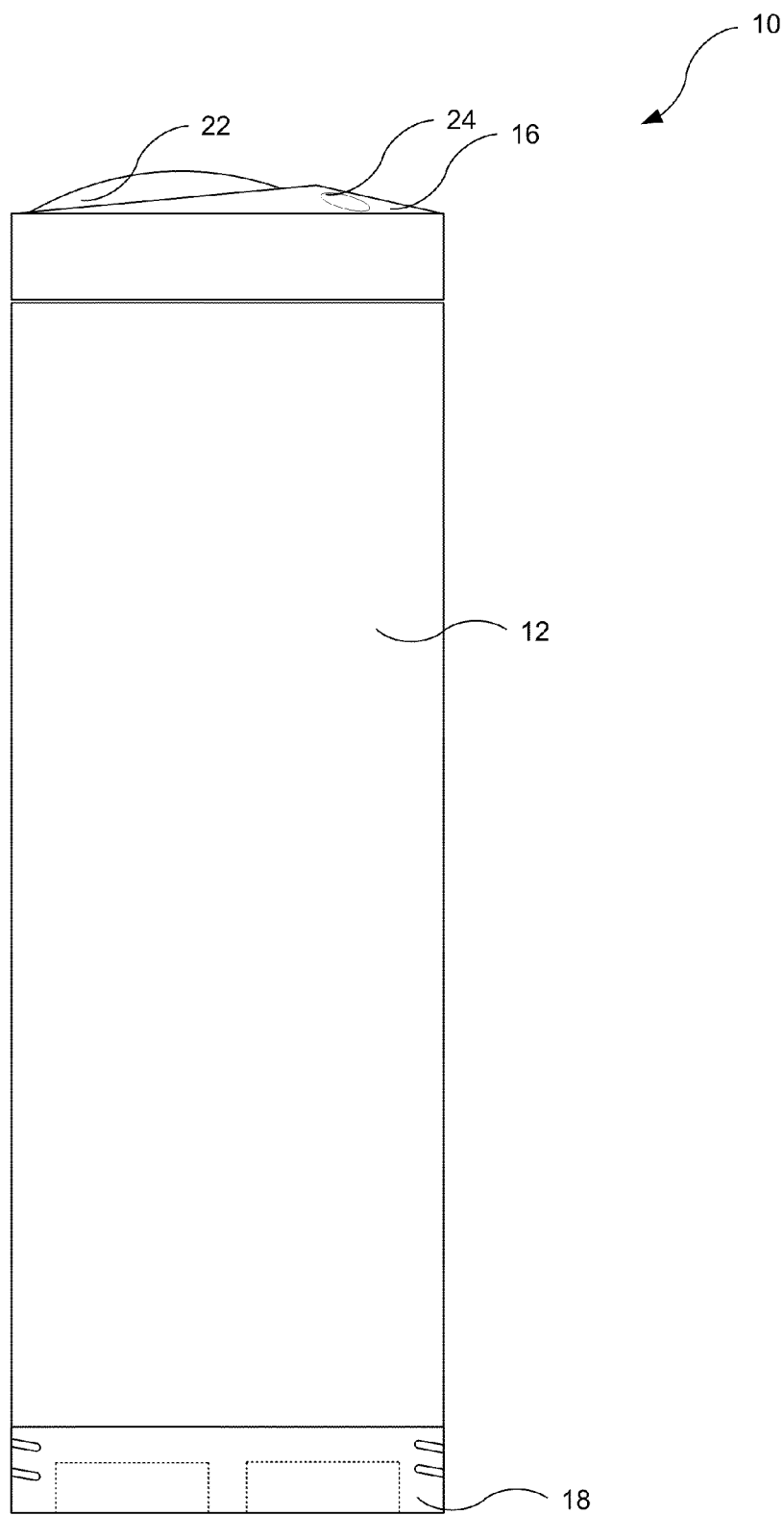
FIG. 1 is a side-view isometric drawing of a pasta dispenser according to embodiments of the invention.

A pasta storage container or dispenser having an integrated portion selector is generally illustrated as 10 in FIG. 1. The dispenser 10 has an elongated shape that is generally 8-12 inches tall, which is tall enough to fully contain standard (10") long noodle pasta. Of course, the dispenser could be sized differently to store shorter or longer pasta noodles.

The dispenser body 12 is generally a thin-walled columnar container having an open top, and sides integrated with a generally flat bottom. In some embodiments the top of the dispenser 10 is enclosed by being attached to or formed integral with a pasta measuring head, lid, or cover as described below. The material thickness of the sidewalls and bottom are dictated by commercial factors such as material cost and weight, and does not affect operation of the dispenser 10. Additionally, the dispenser body 12 may be an existing product to which the measuring portions described below are attached. In such an embodiment either the pasta dispenser manufacturer or the consumer may provide the existing and compatible dispenser body 12.

In a preferred embodiment, the body 12 has a large enough cavity to store a standard box or package of spaghetti or other long noodle. Further, for best operation of the dispenser, the body 12 should be large enough such that an entire package of spaghetti fits fully within the body with extra room so that the noodles can slide over themselves when the dispenser 10 is tipped, as described below.

Preferred embodiments of the body 12 of the dispenser 10 are made from a non-porous material such as food grade plastic, stainless steel, glass, or any other suitable material. The container should preferably serve as sanitary storage that prevents dust, dirt, moisture, and insects or other pests from entering the container when closed. Selection of material for the body 12 will affect how a lid 16 (described below) attaches to the body 12. The outside surface of the body 12 can be formed so as to make the dispenser 10 easy to handle. In some embodiments this could be accomplished by making the body 12 from a plastic having a surface that is partially roughened or shaped, such as a series of ridges, to increase friction when holding the body. In other embodiments a high-friction surface such as a rubber or plastic can be applied to the body 12. In yet other embodiments, the body 12 may have ergonomic recesses that correspond to a person's fingers, which provides a comfortable and secure grip on the body 12 when a person is handling the pasta storage dispenser. All of these embodiments may improve the security of the pasta storage dispenser in a user's hand when it is being tipped over to dispense pasta, especially if it is being tipped over a pot of boiling water where steam may interfere with the user's grip security.

As described in more detail below, the lid 16 includes a projection or fin 22 as well as one or more measuring holes or apertures 24. In operation the user grabs the projection 22 and spins the lid 16 to select a desired measuring aperture 24. The lid 16, which may be used in conjunction with a frame or cover, may include multiple, various-sized apertures each of which allows a different number of portions of pasta to pass when the dispenser 10 is tipped. The user simply spins the lid 16 or otherwise selects the desired number of portions, then tips the dispenser 10 to remove the corresponding amount of pasta.

Figure 2:
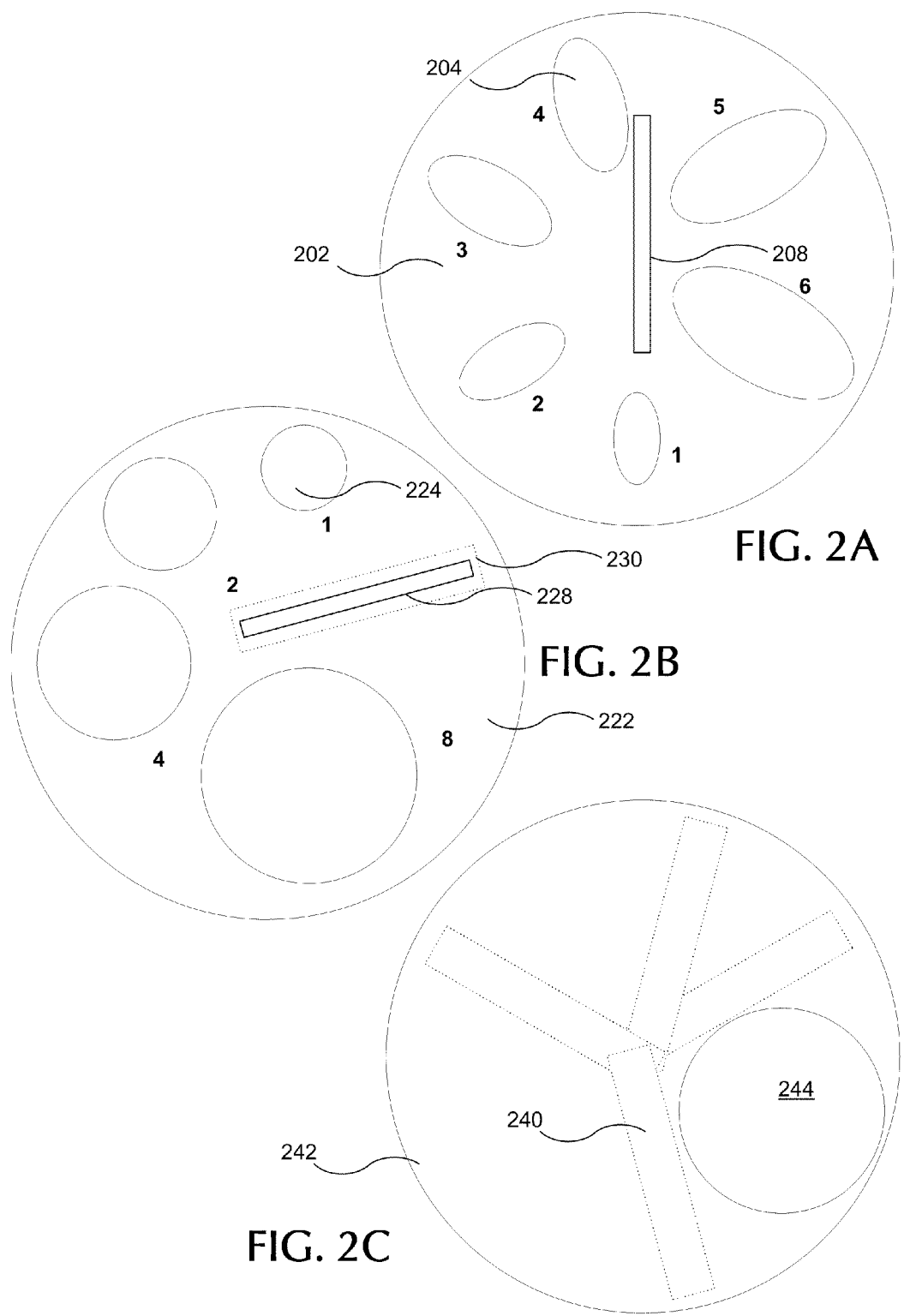
FIGS. 2A and 2B are top-view isometric drawings of a selector wheel that is integrated into the cap of the pasta dispenser of FIG. 1 according to embodiments of the invention.
FIG. 2C is a top-view isometric drawing of a frame structured to support one of the selector wheels of FIGS. 2A and 2B, according to embodiments of the invention.

FIG. 2A is a top view of a portion wheel 202 that controls portion sizes of long pasta as it is removed from the dispenser 10. The portion wheel 202 includes a series of apertures 204 therethrough. In the embodiment illustrated in FIG. 2A, the apertures 204 are elongated ovals. Having oval apertures 204 has an advantage in that more apertures can be included in the portion wheel 202 than if the apertures were circular, as illustrated in FIG. 2B. Another advantage of oval apertures 204 over circular is that more material in the portion wheel 202 is preserved, which makes the portion wheel sturdier. While there are advantages to using non-circular shaped apertures, other factors may dictate that circular apertures be used. Although oval and circular shaped apertures 204 are discussed above, these apertures 204 may be formed in any shape or arrangement that provides an opening through which pasta may be dispensed. The apertures 204 are sized such that a measured, desired amount of pasta will easily slide through the selected aperture when the dispenser 10 is tipped, while the remainder of the pasta continues to be contained within the dispenser. A label near each aperture 204 indicates to the user the standard portion size of the particular aperture. A handle 208 is integrated or otherwise attached to the portion wheel 202 to allow the user to spin the portion wheel to the desired aperture. The handle 208 is sized and shaped for easy manual operation. In some embodiments, the handle 208 may include a circular knob that can easily be gripped and spun by a user, while in other embodiments the handle is a fin or other-shaped projection that allows the user to rotate or select the portion wheel 202. In still further embodiments the user may directly spin a side surface of the portion wheel 202, which may, for instance include serrations to increase grip.

FIG. 2B is a top view of a portion wheel 222, which is similar to the portion wheel 202 illustrated in FIG. 2A. The portion wheel 222 includes circular apertures 224. Differently than in with the portion wheel 202, the portion wheel 222 includes non-sequentially sized apertures 224. For instance, to measure five servings of pasta, the user first measures four servings through the aperture 224 labeled "4," then adds the pasta taken through the aperture 224 labeled "1." Due to manufacturing limitations it may be impossible to include every possible intermediate-sized hole between the largest and smallest aperture 224.

Either of the portion wheels 202, 222 may operate in conjunction with a static frame 242, illustrated in FIG. 2C, which includes its own aperture 244. The static frame 242 may be fixed to the container 12 as described above. The static frame 242 may include a series of recesses 240 that couple with a projection 228 created on a surface of the frame opposite the handle 228. In other words, a projection 230 is made on the underside of the static frame 242, opposite the handle 228. When the portion wheel 222 is rotated, the projection 230 aligns with one of the recesses 240 to keep the portion wheel 222 "locked" in position. In practice the portion wheel 222 may slide relatively easily between selections, yet still feel secure when locked. In operation, the user selects a particular number of portions desired to be measured and rotates the portion wheel to the selected portion. This aligns the correct aperture 224 with the aperture 244 in the frame 242. When the container 10 is tipped, the pasta slides through the aperture 244 of the frame 242 as well as through the measuring aperture 224 of the portion wheel 222. The user then grabs the measured amount of pasta or lets it fall directly into a cooking pot.

Figure 3:
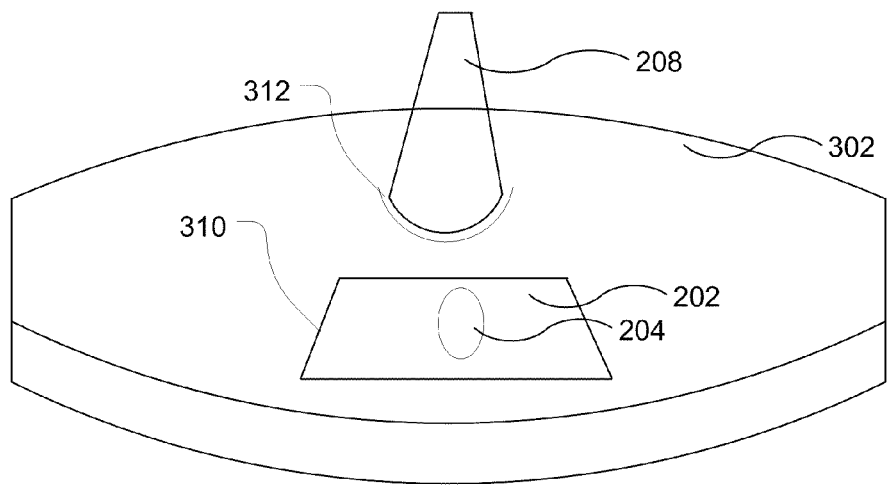
FIG. 3 is a perspective view of the selector wheel of FIG. 2A integrated into a cover assembly having a baffle opening according to embodiments of the invention.

FIG. 3 is a perspective view of another embodiment of the invention. Instead of mating the portion wheel 202 with a frame 242, as illustrated and described with reference to FIGS. 2A, 2B, and 2C, a cover assembly 302 is used in connection with the portion wheel 202, to make the cover or lid for the dispenser 10. The cover assembly includes a baffle opening 310, through which the desired aperture 204 can be selected. In this embodiment the conic form of the handle 208 of the portion wheel 202 extends through a central opening 312 of the cover assembly 302, but other arrangements are acceptable and within the concept of the invention.

The arrangement between the cover assembly 302 and the portion wheel 202 can be any arrangement that allows simple and easy operation of the portion wheel while the cover assembly is attached to the dispenser body 12. In some embodiments the portion wheel 202 has a slideable friction fit relationship with the cover assembly 302, such that the portion wheel can move relatively easily, but remains set at the desired aperture 204 after the user has set it. The friction can come either through the central opening 312 and/or due to contact between an upper surface of the portion wheel 202 and an inside surface of the cover assembly 302. Alternatively, radially-extending ridges may be formed on the top surface of the portion wheel 202 to correspond to a plurality of recesses or grooves formed on a lower surface of the cover assembly 302, similar to the embodiment illustrated in FIGS. 2B and 2C above. The portion wheel 202 may still be rotated relative to the cover assembly 302, but it will snap or lock into place when the ridges match up with the recesses. These matching locations will typically correspond to instances when the apertures 204 are aligned with the baffle opening 310.

In operation, the user grabs the handle 208 and rotates the portion wheel 202 until the desired aperture 204 appears within the baffle opening 310. The user then tips the pasta dispenser 10 upside-down, which causes the desired (and measured) amount of pasta to slide through the selected aperture 204. The extra pasta is blocked from passing through any of the non-selected apertures 204 by the cover assembly 302. Only pasta that passes through both the baffle opening 310 in the cover assembly 302 and the selected aperture 204 within the baffle opening slides from the dispenser 10, while the remaining pasta remains within the dispenser. The user then grabs the measured pasta that extends through the aperture 204 and completely removes it from the dispenser 10 for cooking. The user may also tilt the pasta dispenser 10 directly over a pot of boiling water so that the measured portion of pasta slides directly into the boiling water.

In other embodiments the portion wheel 202 need not be circular, but in fact could be any shape. In one contemplated embodiment the portion wheel 202 could actually be an elongated rectangle or "strip" having apertures 204. In such an embodiment the strip is moved linearly until the desired aperture 204 appears within the baffle opening 310 of the cover assembly 302 or the aperture 244 of the frame 242 of FIG. 2C.

Figure 4:
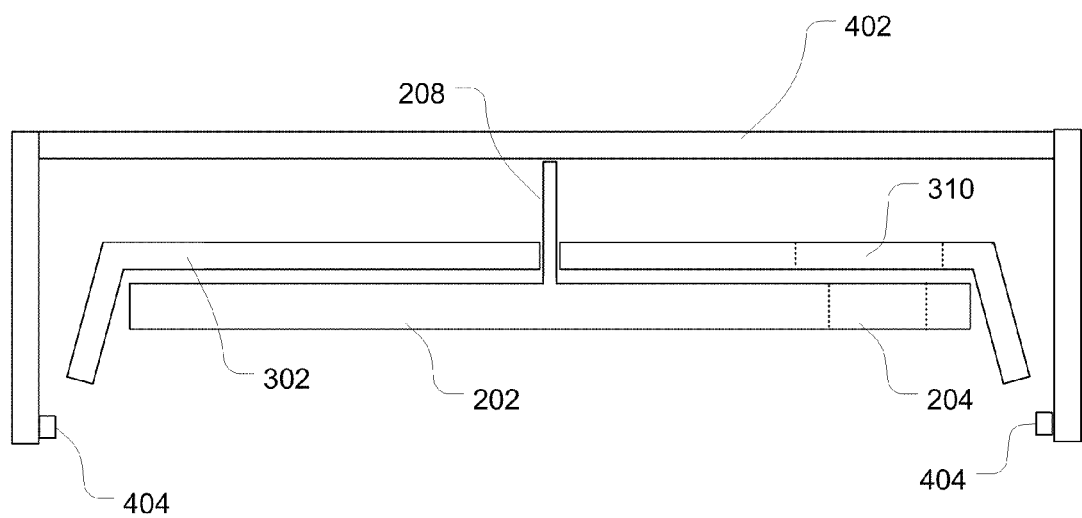
FIG. 4 is a cut-away side view of one of the selector wheels of FIG. 2A or 2B, cover assembly of FIG. 3 and a cover lid according to embodiments of the invention.

FIG. 4 is a side cut-away view of components of the lid 16 of FIG. 1 that attaches to the body 12 (not illustrated) to make the dispenser 10. What is generally referred to as the lid 16 can have various components without deviating from the invention. In the embodiment illustrated in FIG. 4 the lid 16 includes the portion wheel 202, cover assembly 302 and a cap 402. The cover assembly 302 and portion wheel 202 were described above. Although not illustrated in FIG. 4, at least one of the edges of at least one of the apertures 204 of the portion wheel 202 aligns with an inside surface of the container 10 so that the pasta can slide against the inside surface and out the aperture without binding or mis-alignment.

The cap 402 can be a solid cap that completely encapsulates the cover assembly 302 and portion wheel 202. One purpose of the cap 402 is to prevent moisture from passing through the cover assembly 302 and portion wheel 202, which could cause the pasta within the dispenser 10 to go stale. In addition, the cap 402 can prevent dust, insects, or other contaminates from entering the dispenser 10.

In one embodiment the cap 402 is friction fit and "snaps" over the cover assembly 302 using an integrated deformable ridge 404. In other embodiments the cap 402 can have other relationships with the cover assembly 302, such as screw-threads or other known mating mechanisms. In other embodiments, the cap 402 is not present at all, and instead the portion wheel 202 has a "blank" space instead of one of the apertures 204. In such an embodiment, to "close" the dispenser 10, the user moves the blank space in the selector wheel to align with the baffle opening 310, which creates a moisture seal barrier to preserve the pasta within the dispenser. In other embodiments, a reverse orientation of the baffle window and apertures are possible. That is, the cover assembly may have a variety of fixed portion-measuring apertures and the rotatable selector wheel may have a singular baffle opening that lines up with one of the fixed apertures in the cover (or a "blank" space on the cover).

The lid assembly 16, in whatever configuration, is coupled to the dispenser body 12 to create the complete dispenser 10. The coupling mechanism may be fixed or detachable and can include, for example, a snap-fit deformation under a ridge present on the body 12 and cap 402, a threaded engagement between the body 12 and lid assembly 16, a hinged relationship where one portion of the lid assembly is permanently attached to the body 12, or a deformable material seal, such as a rubber seal disposed between the body 12 and the lid assembly 16. In other embodiments, the cover assembly 302 may be statically fixed to the body 12 and a fill cover 18 (FIG. 1) may be included on the lower portion of the body 12 for adding additional pasta to the pasta dispenser 10. The fill cover 18 may be attached to the body 12 by corresponding threaded portions, as illustrated in FIG. 1, and may include a molded handle in recess, also as shown. Other embodiments may attach through snap-fit portions or other similar connection means. Any forms of attachment that allow the pasta to be placed in the body 12 and measured through some sort of cover are acceptable alternatives.

Either or both of the dispenser body 12 and lid 402 may include measuring marks to indicate liquid or solid measure. For example, the lid 402 or dispenser body 12 may include marks for measuring portions of short-noodle pasta, such as macaroni noodles or penne pasta. In another embodiment, the body 12 and/or lid 402 may include measuring marks for a measured amount of water, or olive oil, seasonings, etc. In still further embodiments the body 12 and/or lid 402 may include measuring marks for measuring multiple different types of contents.

Figure 5:
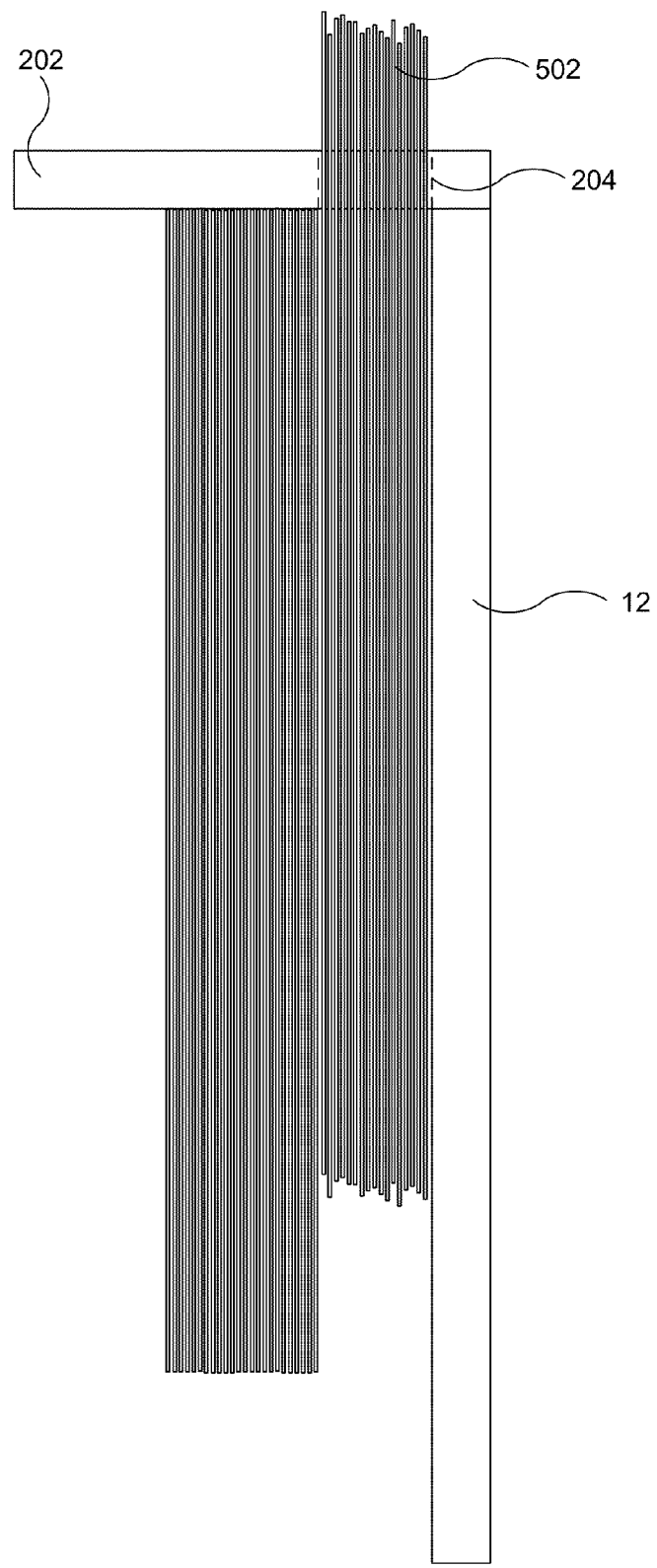
FIG. 5 is a side view of an edge of the dispenser of FIG. 1 in concert with one of the selector wheels of FIG. 2A or 2B according to embodiments of the invention.

FIG. 5 is a cutaway side-view of one side of the dispenser body 12 and its relationship to a section of the portion wheel 202 that includes apertures 204. Additionally FIG. 5 illustrates long-noodle pasta 502 sliding through an aperture 204 for use. One feature included in some embodiments is that the edge of the aperture 204 of the selection wheel 202 aligns with the inside surface of the dispenser body 12. This feature allows the pasta 502 to easily slide down an edge of the dispenser body 12 and out the aperture 204. If instead the aperture extended beyond the inside edge of the dispenser body 12 or did not extend far enough toward the edge, or otherwise be out of alignment, the pasta may lean or tilt as the pasta is sliding out of the aperture 204, which could cause the pasta to get stuck within the aperture. Using the structure described above the pasta generally slides directly down the inside surface of the dispenser body and through the aperture 204 without clogging the aperture.

Figure 6:
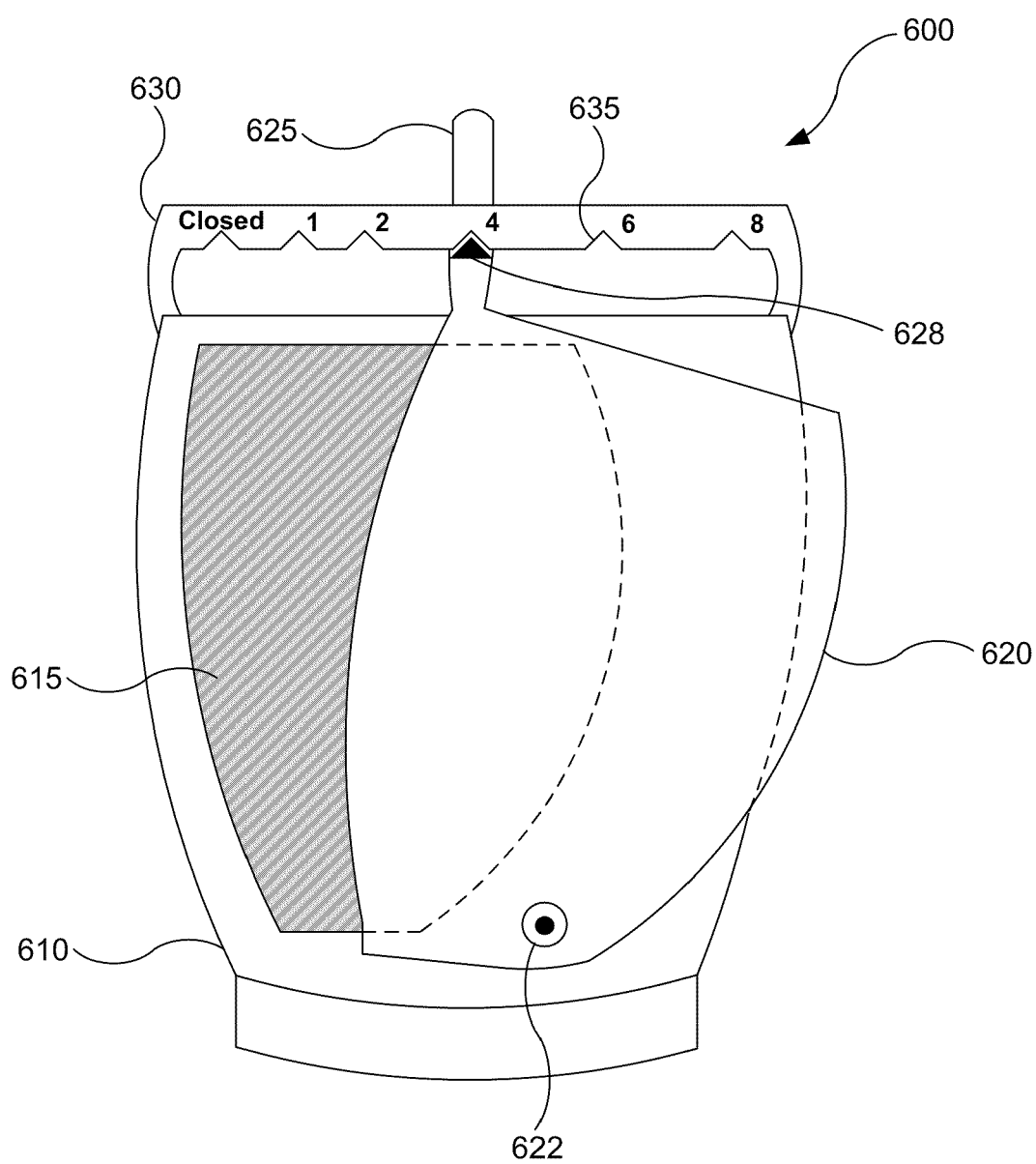
FIG. 6 is a perspective view of a lid assembly according to embodiments of the invention.
Figure 7:
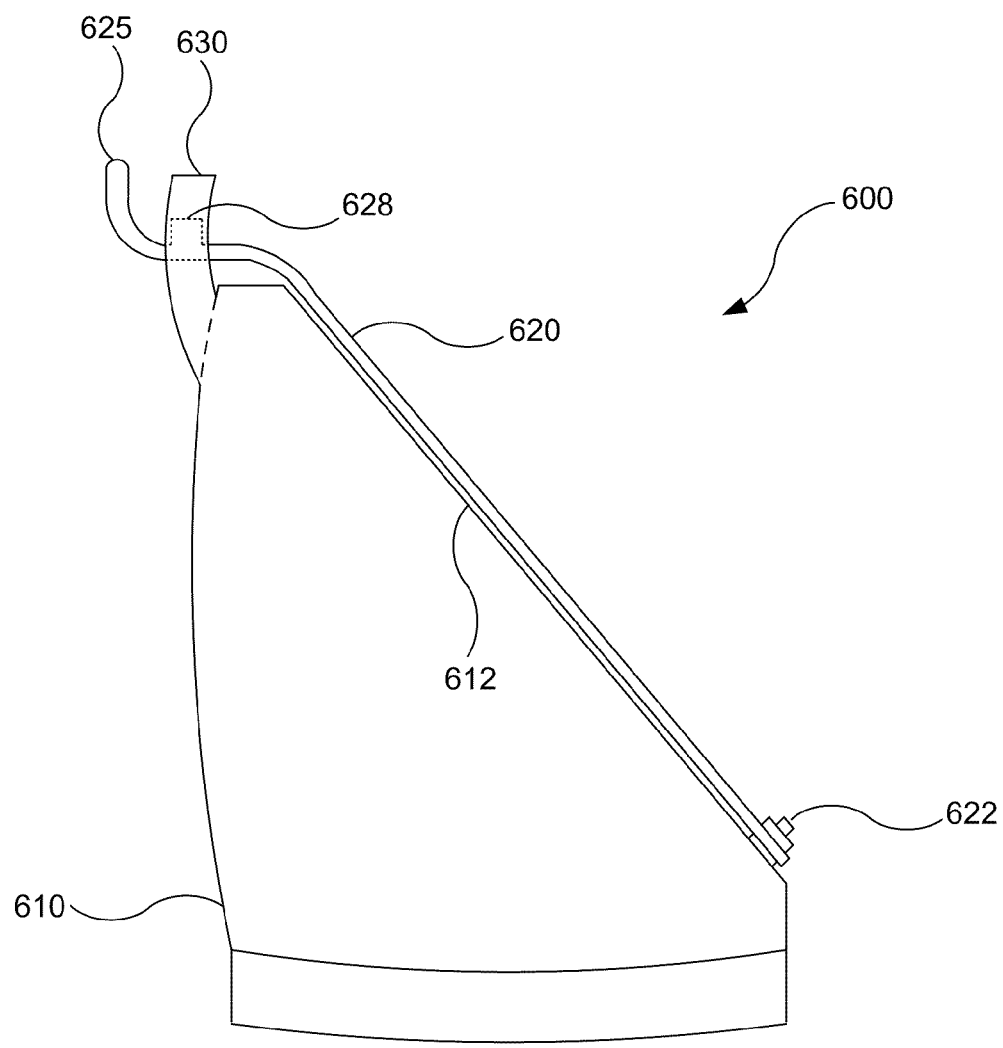
FIG. 7 is a side view of the lid assembly of FIG. 6 according to embodiments of the invention.

FIGS. 6 and 7 show another embodiment of a lid assembly for the pasta dispenser that allows a user to dispense various measured portions of pasta. FIG. 6 is a perspective view of a lid assembly 600 according to other embodiments of the invention. Unlike the lid 16 illustrated in FIGS. 2A, 2B, 2C, 3 and 4, which included a selector wheel 202 having separate apertures 204 for dispensing a portion-related amount of pasta, the lid assembly 600 includes a cover or shutter 620 that can be operatively moved to increase or decrease an exposed area of a portion opening 615 of the lid assembly 600 for dispensing a portion-related amount of pasta.

As shown in FIG. 6, the lid assembly 600 includes a head unit 610 that attaches or is integral with to the elongated body 12 of the pasta dispenser. The head unit 610 may include a relatively flat face 612 in which the singular portion opening or aperture 615 is formed. A cover or shutter 620 is attached to the head unit 610 through a pivot or hinge 622 so that the cover 620 can be moved by the user relative to the head unit 610 to expose more or less of the portion opening 615. The pivot 622 may include a pivot receiver (not shown) formed on or within the head unit 610 and a nub (not shown) formed on or integral with the cover 620 to interface with the pivot receiver. This pivot 622 configuration allows the cover 620 to rotate about the pivot 622 relative to the head unit 610.

The head unit 610 may also include a selection lock 630 having a series of notches or indentations 635. The cover 620 includes a selector handle (yieldable portion) 625 that extends from the cover 620 to interface with the selection lock 630. The selector handle 625 may be sized appropriately or may additionally include a ridge 628 that correlates to the series of notches 635 so that the selector handle and its attached cover 620, are held in place once an opening size is selected. The selector handle 625 may for formed of a material that can deform or yield slightly without damage to the material so that the selector handle 625 may be relatively easily and securely moved among the notches of the selection lock 630.

In the embodiments illustrated in FIGS. 6 and 7, the selection lock 630 is integrally formed with the head unit 610 to form a handle-shaped attachment with the notches 635 being formed on the underside of the selection lock 630. However, in other embodiments, the selection lock 630 may simply include a top edge of the head unit 610 that has notches 635 pointing upward. In this arrangement, the selector handle 625 of the cover 620 would be formed to fit over the top of the selection lock 630 with a ridge 628 oriented downward to correlate with the notches 635.

The lid assembly 600 may be attached to the body 12 of the pasta dispenser 10 in a similar manner to the embodiments discussed above. In operation, the cover 620 may be rotated relative to the head unit 610 by moving the selector handle 625 between the notches 635 of the selection lock to uncover or expose a desired amount of the portion opening 615. The notches 635 on the selection lock 630 may be associated with portion measurements so that a user could move the selector handle 625 to a particular position where the ridge 628 of the selector handle 625 interfaced with a notch 635 associated with a desired portion measurement. When a desired portion measurement is obtained, the user simply tilts the pasta dispenser 10 to allow the desired portion of pasta to pass through the portion opening 615 while retaining the remainder of the pasta in the dispenser 10. The cover 620 may be further configured to completely cover and seal the portion opening 615 when it is completely closed, e.g., when the selector handle 625 is moved to the far left in FIG. 6.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A container for storing long-noodle pasta, comprising:
   an elongated body structured to contain more than one portion of the pasta; and
   a portion control mechanism coupled to the elongated body, the portion control mechanism including a static member fixedly attached to the elongated body and the portion control mechanism including a rotatable portion, the portion control mechanism including a plurality of differently sized apertures structured to be individually and uniquely selected and through a selected aperture a corresponding-sized portion of long-noodle pasta from within the elongated body can pass.

2. The container of claim 1 in which the pasta that cannot fit through the selected aperture is held within the container when the container is tilted from a upright orientation.

3. The container of claim 1 in which the plurality of differently sized apertures are discretely sized.

4. The container of claim 1 in which the rotatable portion of the portion control mechanism includes the plurality of differently sized apertures.

5. The container of claim 1 in which the static member of the portion control mechanism includes a baffle opening.

6. The container of claim 1 in which the static member of the portion control mechanism includes the plurality of differently sized apertures.

7. The container of claim 1 in which the rotatable portion of the portion control mechanism includes a baffle opening.

8. The container of claim 1 in which the elongated body includes a removable bottom closure formed on an opposite end of the elongated body from the coupled portion control mechanism.

9. The container of claim 1 in which an inner portion of a sidewall of the elongated body is substantially coplanar with at least one edge of each aperture.

10. The container of claim 1 in which an edge of at least one of the apertures aligns with an inside surface of the elongated body.

11. A pasta storage device comprising:
    an elongated body structured to contain two or more portions of pasta; and
    a measuring portion, including:
      a head unit attached to the elongated body, the head unit having a relatively flat face, and the head unit further including an aperture sized to let a portion of the pasta pass from within the elongated body; and
      a shutter shaped to generally mate with the face of the head unit and structured to pivot to selectively block the aperture of the head unit.

12. The pasta storage device of claim 11 in which the head unit further comprises a series of indentations structured to receive a yieldable portion of the shutter.

13. The pasta storage device of claim 12 in which moving the yieldable portion of the shutter to a different indentation changes the amount of aperture that is blocked by the shutter.

14. The pasta storage device of claim 13 in which the yieldable portion of the shutter includes a ridge that interfaces with a selected one of the series of indentations.

15. The pasta storage device of claim 12 in which the series of indentations correspond to a measured portion of pasta.

16. The pasta storage device of claim 12 in which the series of indentations are formed on an underside surface of a handle-shaped selection lock extending from the head unit.

17. The pasta storage device of claim 12 in which the series of indentations are formed on an upper surface of the head unit.

18. The pasta storage device of claim 11 in which the head unit includes a pivot receiver, and in which the shutter includes a pivot structured to engage the pivot receiver.

19. A pasta container comprising:
    a substantially cylindrical elongated body structured to hold multiple portions of long-noodle pasta; and
    a lid assembly structured to be coupled to the elongated body, the lid assembly including:
      a fixed portion having at least one aperture to allow pasta stored in the elongated body to pass through, and
      a rotatable portion structured to interface with the fixed portion and configured to expose at least a portion of the at least one aperture of the fixed portion to allow a measured-portion of pasta to pass through the exposed portion of the at least one aperture.

20. The pasta container of claim 19 in which the rotatable portion includes a plurality of discrete differently-sized openings.

21. The pasta container of claim 19 in which the rotatable portion includes a cover configured to pivot relative to the fixed portion to expose variable portions of the at least one aperture of the fixed portion.

22. The pasta container of claim 19 in which the at least one aperture of the fixed portion aligns with an inside surface of the elongated body.

* * * * *